(12) United States Patent
Zhang et al.

(10) Patent No.: US 10,990,571 B1
(45) Date of Patent: Apr. 27, 2021

(54) ONLINE REORDERING OF DATABASE TABLE COLUMNS

(71) Applicant: Amazon Technologies, Inc., Seattle, WA (US)

(72) Inventors: Zhaohui Zhang, Menlo Park, CA (US); Sheng-Liang Song, Fremont, CA (US); Aakash Shah, Santa Clara, CA (US); Kamal Kant Gupta, Snoqualmie, WA (US); Xiaofeng Bao, Fremont, CA (US); Saileshwar Krishnamurthy, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 15/904,646

(22) Filed: Feb. 26, 2018

Related U.S. Application Data

(60) Provisional application No. 62/619,644, filed on Jan. 19, 2018.

(51) Int. Cl.
*G06F 16/22* (2019.01)
*G06F 16/21* (2019.01)
*G06F 16/23* (2019.01)

(52) U.S. Cl.
CPC ........ *G06F 16/2272* (2019.01); *G06F 16/213* (2019.01); *G06F 16/221* (2019.01); *G06F 16/2282* (2019.01); *G06F 16/2379* (2019.01)

(58) Field of Classification Search
CPC .................................................... G06F 16/221
USPC .......................................................... 707/696
See application file for complete search history.

(56) References Cited

U.S. PATENT DOCUMENTS

| | | | |
|---|---|---|---|
| 5,717,924 A * | 2/1998 | Kawai | G06F 16/289 |
| 5,794,030 A | 8/1998 | Morsi et al. | |
| 6,356,913 B1 | 3/2002 | Chu et al. | |
| 7,287,034 B2 | 10/2007 | Wong et al. | |
| 2018/0107725 A1* | 4/2018 | Bi | G06F 3/06 |
| 2019/0026339 A1* | 1/2019 | Bastawala | G06F 16/24553 |

OTHER PUBLICATIONS

U.S. Appl. No. 15/360,787, filed Nov. 23, 2016, Aakash Shah et al.

* cited by examiner

*Primary Examiner* — Robert W Beausoliel, Jr.
*Assistant Examiner* — Pedro J Santos
(74) *Attorney, Agent, or Firm* — Robert C. Kowert; Kowert, Hood, Munyon, Rankin & Goetzel, P.C.

(57) ABSTRACT

Online reordering for database table columns may allow a user to reorder the columns of a database table without taking the database offline. A mapping between different column orders for a database table may be generated and stored in response to a request to reorder columns in a database table. When a portion of the database table is accessed, the columns of the database table in the accessed portion of the database table may be reordered to perform the access request.

20 Claims, 11 Drawing Sheets

```
create table t1 (id int, lname char(20));          ~712 alter table t1 add column fname varchar(20) after id;   ~714 alter table t1 add column uuid bigint first;   ~716 alter table add column phone varchar(100) after fname, add column zip int(5) not null;   ~718
```

| Field Name | Column Order V0 | Column Order V1 | Column Order V2 | Column Order V3 |
|---|---|---|---|---|
| uuid |  |  | 0 | 0 |
| id | 1 | 0 | 1 |  |
| fname | 2 | 2 |  |  |
| phone | 3 |  |  |  |
| lname | 4 | 3 | 2 |  |
| zip | 5 |  |  | 1 | schema translation mapping 700

ONLINE REORDERING OF DATABASE TABLE COLUMNS

RELATED APPLICATIONS

This application claims benefit of priority to U.S. Provisional Application Ser. No. 62/619,644, entitled "STORAGE FORMAT TRANSLATION FOR ON-DEMAND DATA SCHEMA MODIFICATIONS," filed Jan. 19, 2018, and which is incorporated herein by reference in its entirety.

BACKGROUND

Data schemas optimize the ways in which stored data is managed or accessed in a data store. For example, a common data model, such as a relational data model, may allow for storage engines or other systems that access the data to utilize languages or commands based on first-order predicate logic to search for data that satisfies quantified variables. For example, Structured Query Language (SQL) allows for queries to be performed over data that satisfy various predicate conditions identified by a SQL statement. Changes can be performed with respect to data schemas in order to change the optimization of the data. If, for instance, additional information should be stored as part of individual items in a data set, then the data schema may be changed to account for or identify that the additional information is included in items. As changes to a data schema impact an entire set of data stored according to the data schema, implementing changes to the data schema may grow more costly as the amount of data increases. With the amount of data collected and managed growing ever larger, efficiently performing changes to data schemas con provide correspondingly greater cost savings.

BRIEF DESCRIPTION OF THE DRAWINGS

FIG. 7 illustrates an example schema translation mapping for different column orders of a same database table, according to some embodiments

Figure 1:
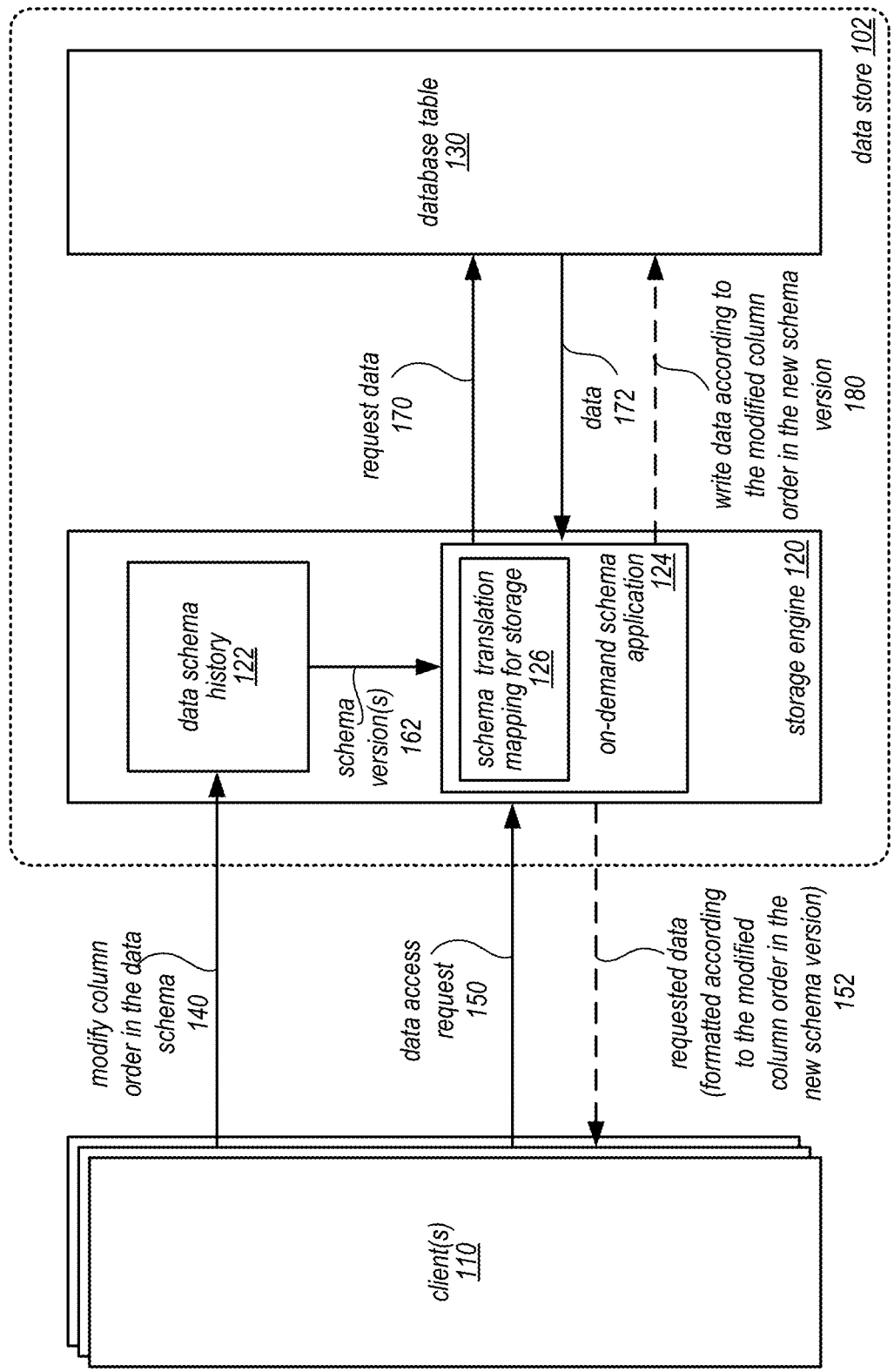
FIG. 1 is a logical diagram that illustrates storage format translation for online reordering of database table columns, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of online reordering of database table columns are described herein. Data schemas (e.g., data structures, formats, models, or other information describing how data in a data set should be stored) may be implemented for data sets stored in a data store, in various embodiments. Access requests, such as searches or queries for particular data, as well as access requests to add, remove, change, modify, or otherwise update existing data may utilize the data schema in order to execute the access request, in various embodiments. For example, a data set may be stored as a relational database table that includes various rows, items or entries including a number of data fields corresponding to different columns in the database table, in various embodiments. The columns of the database table, including a data type for the data stored in a column, may be defined, identified, or otherwise described by the data schema for the database table, in various embodiments. As the information that is needed to be maintained in a data set can change, corresponding changes in the data schema can be made to accommodate the changing information, in various embodiments. For example, a column in a database table can be added or removed resulting in a change to the order of columns in the data schema, so that the data set provides access to the data in an expected format (e.g., the reordered columns), in some embodiments.

Changes to a data schema may be specified according to an interface for managing a data set, in some embodiments. The interface may interpret data definition language (DDL) requests that can define or redefine a data schema for data, in some embodiments. For example, data sets maintained in a relational database table, may be accessed or managed using Structured Query Language (SQL) interface. SQL includes statements, such as "CREATE TABLE," "ALTER TABLE," or "DROP TABLE," that can be submitted as requests to be performed in a data store that affect the data schema for tables stored in the data store (e.g., upon creation, alteration, or deletion of tables), in some embodiments. Such changes to the data schema once submitted may affect the entire set of data (e.g., the entire table) to which the data schema is applied, in some embodiments. So if a data schema change is made to add an additional column to a database table, for example, then the data schema change would direct that each row in the database table add an additional field corresponding to the additional column. Because data schema changes may affect the entire database table, several different techniques for maintaining data consistently (with respect to attempts to access the data while data schema changes are performed) may be implemented, in some embodiments.

Online data schema changes can utilize additional storage space to recreate a duplicate of the data set according to a submitted data schema change, in some embodiments. While the duplicate data set is constructed, access to the original data set (formatted according to the data schema without the change) is allowed, in some embodiments. Once the duplicate of the data set is completed, access requests may then be redirected to the duplicate data set stored according to the updated data schema, in some embodiments. On-demand (e.g., lazily performed) data schema modifications that permit online data schema changes without burdensome costs of creating duplicate data sets may be implemented, in some embodiments, utilizing translation mappings to permit columns in a database table to be re-ordered (e.g., by translating a format of a database table such as the order of columns of the table as stored in storage into another format that would be expected as a result of a modified data schema that has reordered the columns of the database table). In this way, resources may be better devoted to handling requests to access a data set, even if that data set is undergoing a data schema change, in some embodiments.

FIG. 1 is a logical diagram that illustrates storage format translation for online reordering of database table columns, according to some embodiments. Storage engine 120 may be any type of access controller that processes requests from client(s) 110 of data store 102, such as a database management system or engine that provides client access to a database, in some embodiments. Storage engine 120 may process both requests to access data 150 in database table 130 and requests to modify a column order in the data schema 140 for database table 130 (e.g., DDL requests), in some embodiments. Database table 130 may be any collection of data stored according to a data schema (e.g., a data structure, such as binary tree (b-tree), that maintains data blocks, pages, or other storage locations that include one or multiple items of data (e.g., rows in a table) in data store 102 on one or more storage devices (e.g., persistent, block-based storage devices such as hard disk drives (HDDs) or solid state drives (SSDs)), in some embodiments. Storage engine 120 may be implemented as part of data store 102 and may be remote from database table 130 (e.g., via network connection from a computing device implementing storage engine 120 and a remote storage server implementing storage devices that maintain database table 130 as discussed with example database service and storage service in FIGS. 2-5 below), or local to database table 130 (e.g., as part of the same computing device, where database table 130 is stored in persistent storage devices directly attached to the computing device), in some embodiments.

Storage engine 120 may process requests to modify column order in the data schema 140 for database table 130, in some embodiments. For example, if storage engine 120 provides a SQL interface to client(s) 110, then an ALTER TABLE request may be submitted by a client(s) 110 to change a table, in some embodiments. Storage engine 120 may store a description of the modification to the schema in data schema history 122 and update a schema translation mapping for storage 126, as discussed below with regard to FIGS. 6 and 7. In this way, request to modify data schema 140 may reorder (including adding, sorting or removing) columns from database table 130 while database table is still online and available for other access requests, in some embodiments. In some embodiments, data schema history 122 may be persistently stored along with other storage engine 120 metadata (e.g., as part of a data dictionary) in persistent storage devices that maintain database table 130. In some embodiments, an in-memory cache (e.g., such as in system memory 2020 in FIG. 11) of data schema history 122 may be implemented so that descriptions received modifications 140 may be stored in the in-memory cache (in addition to persistent storage). Similarly, the in-memory cache may store schema translation mappings 126 for accessing data from database table according to the ordering of columns of the data stored in persistent storage, in some embodiments. Once the description of the modification is stored in data schema history 122 and the translation between the new schema and the previous schema is stored, as discussed below with regard to FIG. 8, then the data schema modification may be considered applied to database table 130. A series of modifications may be stored so that different versions of the data schema at different points in time may be recreated from the descriptions of the changes in data schema history, in some embodiments (e.g., translating between different column orders as discussed below with regard to FIGS. 6-9).

For example, client(s) 110 (which may or may not be the same client that submitted a data schema modification 140) may also submit data access requests 150 to storage engine, in some embodiments. Data access requests 150 may be specified according to a data modification language (DML). For example, consider the SQL interface noted above. In addition to DDL statements, SQL may also provide for DML statements, such as INSERT, UPDATE, or DELETE, in some embodiments. Data access request 150 may also be a request to search, evaluate, or otherwise query data set 130 for particular data that satisfies different conditions, in some embodiments. For example, the SQL interface provides a SELECT statement which includes one or multiple predicate conditions defined by WHERE statements within the SELECT statement that may be query to find data that satisfies the WHERE statements, in some embodiments. In some embodiments, access requests 150 may be performed as part of a transaction directed to data set 130 which may have been initiated prior to the receipt of a request to modify data schema 140. Storage engine 120 may implement on-demand schema application 124 when processing data access requests 150 so that schema changes are applied to data as the data is accessed to service the access request, in some embodiments (e.g., reordering columns that are stored in a different order in storage as discussed below with regard to FIGS. 6-9).

An access request 150 that modifies data set 130, such as a write request (e.g., INSERT or UPDATE in SQL) discussed below with regard to FIG. 6, may be received, in some embodiments. In order to perform the write request, the current one of the versions 162 of the schema of the data may be identified according to data schema history 122 and the schema translation mapping 126 for database table 130 applied to request the data 170 from storage according to the format of the data in storage (e.g., the on-disk format of the data, such as the ordering of fields of a row as stored on-disk), in some embodiments. For example, the format of the data (e.g., a data page, block, row, or other portion) of database table 130 in storage may include ordered columns A, B, and C where the value of each column in the is stored in the column order (e.g., A's value is stored next to B's value which is stored next to C's value). If the data schema for database table 130 changes received prior to the write request (but has not yet been applied to the requested data), then the previously received schema changes may be applied (e.g., writing the field values of the columns of the row according to the ordering of columns identified for the table in schema translation mapping 126) when the write is performed, in some embodiments. For example, if the data schema is modified to order the database columns as A, D, B, C, E, then the data may be written according to the modified column order.

Applying the version 162 of the data schema may be performed different for different access requests. If, for instance, the data access request is a read request, then storage engine 120 may request the data 170 from database table 130 according to a translated format identified in schema translation mapping 126 and then reformat the data 172 that is received from data set 130 to apply the current version 162 of the schema according to the translation(s) in schema translation mapping for storage, in some embodiments (as discussed below with regard to FIG. 9). For example, if the order of columns is to be changed according to schema version 162, then the order of columns in data 172 may be changed as indicated in schema translation mapping for storage 126, in some embodiments. This reformatted data may then be used to return request(s) 152 (e.g., with data formatted according to the modified column order in the new schema version).

If the access request is a write request, then the data (e.g., the row, page, bloc, or other portion) in database table 130 may be changed to match schema version 162, in some embodiments. For instance, if writing new data, the new data may be written according to the new schema version 180, which as discussed above may write the new data according to an order identified by the schema translation mapping 126. In this way, each time data is added or modified in database table 130, the changes to the data schema may be applied on-demand, accordingly translating between different orderings of database table columns specified in schema translation mapping 126 for storage, in some embodiments. In this way, data schema changes are applied as needed without utilizing any additional storage space, allowing for near instantaneous application of data schema changes, in some embodiments. Moreover, as a larger data structure in which the data is stored need not be changed (e.g., a b-tree structure), data schema changes may be performed in way that is backward and forward compatible with storage engines or other applications that access the data based on an understanding of the larger data structure, in some embodiments.

Please note, FIG. 1 is provided as a logical illustration of storage format translation for online reordering of database table columns, and is not intended to be limiting as to the arrangement or configuration of a storage engine, data set, clients, or other components to implement online reordering of database table columns.

The specification first describes an example of a database service that may implement storage format translation for online reordering of database table columns in databases hosted by the database service, according to various embodiments. The example database service may host data for many different types of clients, in various embodiments. Included in the description of the example network-based database service are various aspects of the example network-based database service along with the various interactions between the database service and a separate storage service which may store the data on behalf of the database service. The specification then describes a flowchart of various embodiments of methods for storage format translation of on-demand data schema modifications. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit access requests and data schema modifications using Open Database Connectivity (ODBC) and/or Java Database Connectivity (JDBC) driver interfaces to the database system.

More specifically, the systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., request processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, log record manipulation, and/or various space management operations) may be offloaded from the database engine to the storage layer (or tier), such as a distributed storage system, and distributed across multiple nodes and storage devices, in some embodiments. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may enforce some of the so-called ACID properties, in particular, the Atomicity of transactions that target the database, maintaining Consistency within the database, and ensuring Isolation between the transactions that target the database.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the example layers), and then adding glue logic to stitch them together. In some embodiments, the systems described herein may instead offload the functionality of durability and space management layer from the database tier to a separate storage layer, and may distribute that functionality across multiple storage nodes in the storage layer.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the storage layer may also assume the responsibility for the replication of data stored on behalf of clients (and/or metadata associated with that data, such as redo log records) across multiple storage nodes.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side to driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an TOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

Figure 2:
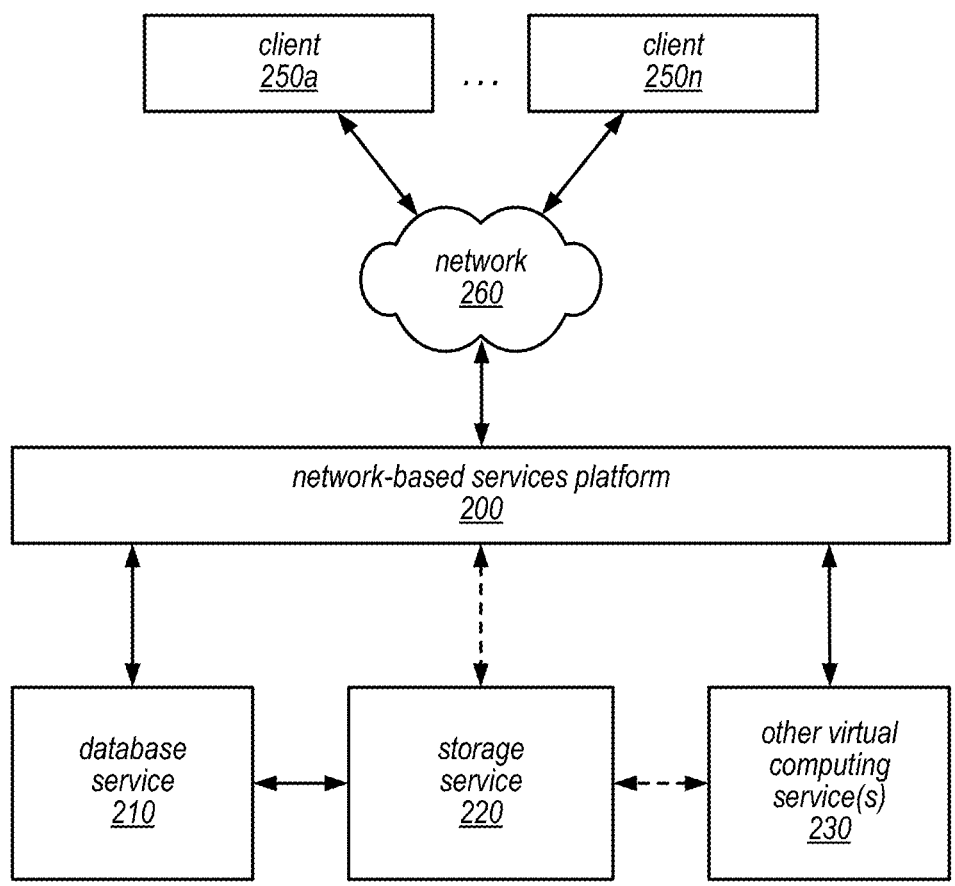
FIG. 2 is a block diagram illustrating a service system architecture that may implement a network-based database service and a network-based storage service that may provide access to data, according to some embodiments.

FIG. 2 is a block diagram illustrating a service system architecture that may implement a network-based database service and a network-based storage service that may provide access to data, according to some embodiments. In the illustrated embodiment, a number of clients (shown as clients 250*a*-250*n*) may interact with a network-based services platform 200 via a network 260. Network-based services platform 200 may interface with one or more instances of a database service 210, a storage service 220 and/or one or more other virtual computing services 230. Storage service 220 may be implemented as log-structured storage using a single log sequence number space, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services (e.g., a request to generate a snapshot, etc.). For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to network-based services-based storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., a request to modify a data schema of a database table stored in data storage service 220 or a request to query a database) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints that receive and process network-based services requests, such as requests to access data pages (or records thereof). For example, network-based services platform 200 may include hardware and/or software may implement a particular endpoint, such that an HTTP-based network-based services request directed to that endpoint is properly received and processed. In one embodiment, network-based services platform 200 may be implemented as a server system may receive network-based services requests from clients 250 and to forward them to components of a system that implements database service 210, storage service 220 and/or another virtual computing service 230 for processing. In other embodiments, network-based services platform 200 may be implemented as a number of distinct systems (e.g., in a cluster topology) implementing load balancing and other request management features may dynamically manage large-scale network-based services request processing loads. In various embodiments, network-based services platform 200 may support REST-style or document-based (e.g., SOAP-based) types of network-based services requests.

In addition to functioning as an addressable endpoint for clients' network-based services requests, in some embodiments, network-based services platform 200 may implement various client management features. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, network-based services platform 200 may also implement user authentication and access control procedures. For example, for a given network-based services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network, shown as the solid line between storage service 220 and database service 210 (e.g., through an API directly between the systems that implement these services). In such embodiments, the use of storage service 220 in storing databases on behalf of clients 250 may be transparent to those clients. In other embodiments, storage service 220 may be exposed to clients 250 through network-based services platform 200 to provide storage of databases or other information for applications other than those that rely on database service 210 for database management. This is illustrated in FIG. 2 by the dashed line between network-based services platform 200 and storage service 220. In such embodiments, clients of the storage service 220 may access storage service 220 via network 260 (e.g., over the Internet). In some embodiments, a virtual computing service 230 may receive storage services from storage service 220 (e.g., through an API directly between the virtual computing service 230 and storage service 220) to store objects used in performing computing services 230 on behalf of a client 250. This is illustrated in FIG. 2 by the dashed line between virtual computing service 230 and storage service 220. In some cases, the accounting and/or credentialing services of platform 200 may be unnecessary for internal clients such as administrative clients or between service components within the same enterprise.

Although not illustrated, in various embodiments storage service 220 may interface with backup data store, system, service, or device. Various data, such as data pages, log records, and/or any other data maintained by storage service internal clients, such as database service 210 or other virtual computing services 230, and/or external clients such as clients 250a through 250n, may be sent to a backup data store.

Figure 3:
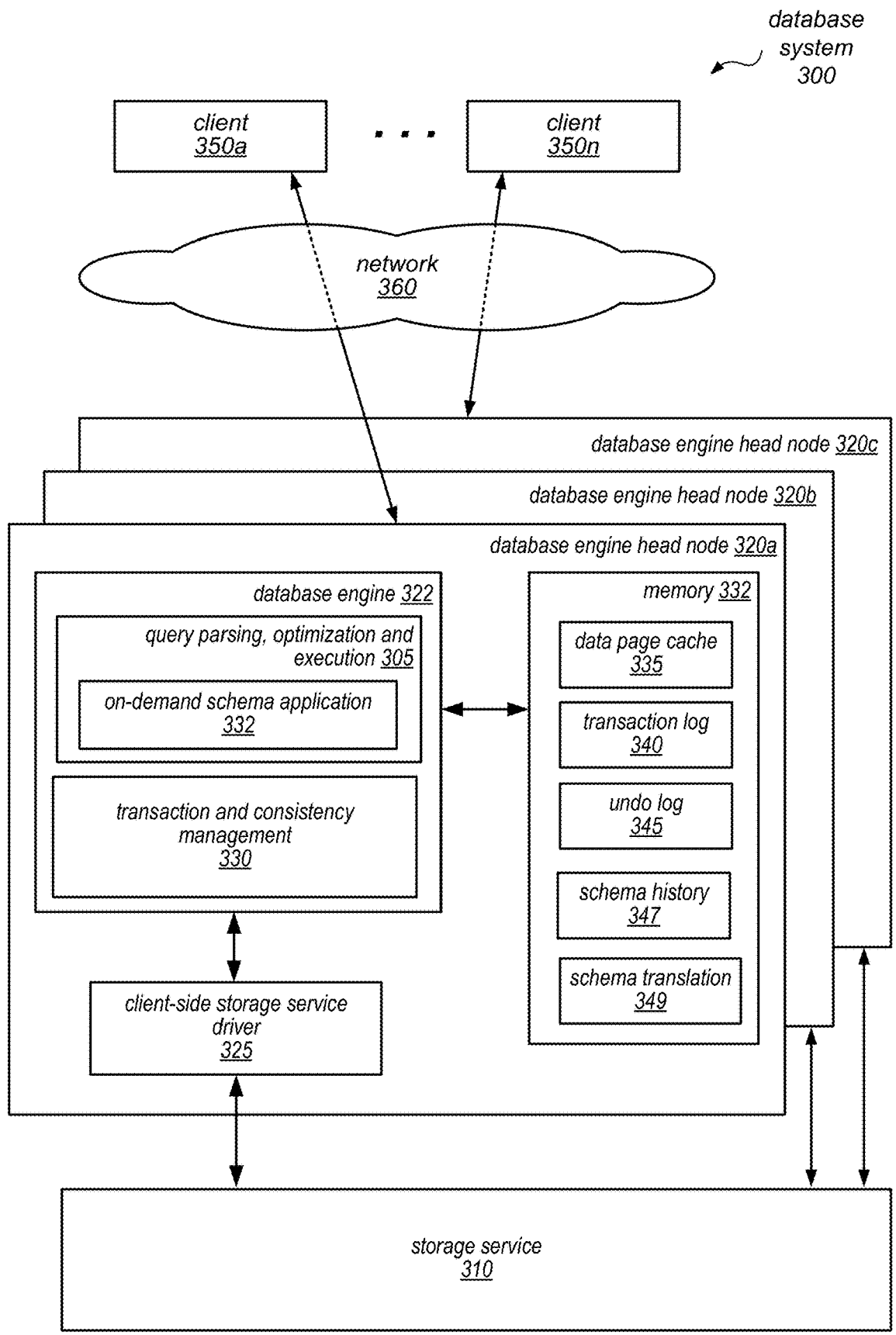
FIG. 3 is a block diagram illustrating various components of a database service that includes a database engine that implements online reordering of database table columns for data maintained in a separate storage service, according to some embodiments.

FIG. 3 is a block diagram illustrating various components of a database service that includes a database engine that implements storage format translation for on-demand data schema modifications for data maintained in a separate storage service, according to some embodiments. In this example, database system 300 includes a respective database engine head node 320 for each of several databases and a storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., access requests, data schema modification requests, etc.) from various client programs (e.g., applications) and/or subscribers (users), then parses them, optimizes them, and develops an execution plan to carry out the associated database operation(s). In the example illustrated in FIG. 3, a query parsing, optimization, and execution component 305 of database engine head node 320a may perform these functions for queries that are received from database client 350a and that target the database instance of which database engine head node 320a is a component. In some embodiments, query parsing, optimization, and execution component 305 may return query responses to database client 350a, which may include write acknowledgements, requested data pages (or portions thereof), error messages, and or other responses, as appropriate.

In some embodiments, query parsing, optimization, and execution component 305 may implement on-demand schema application 332 which may perform the various techniques discussed below with regard to FIGS. 6-10. For example, a request to alter a database table, such as a request to drop a column in a table, may be received at database engine head node 320a. Database engine 322 may parse the request via query parsing, optimization and execution 305 to determine that the request includes a request to modify the data schema for the table. On-demand schema application 332 may write a description of the modification to in-memory cache schema history 347 and a translation of the change in column ordering to schema translation mapping 349 in memory 332. Database engine 322 may also generate a redo log record indicating that stores the description as a change to the schema history 347 and translation mapping 349 that is maintained as part of metadata for the database table persistently in distributed storage service 310 in a manner similar to the various techniques discussed below for updates or queries to user data below with regard to FIG. 5.

On-demand schema application 332 may also determine whether a new version of a data schema is to be applied to data that is accessed to process access requests, such as queries which read data or requests to insert new data or update existing data, which write data. For example, a logical sequence number (LSN) may be assigned to each redo log record that is generated and sent to storage service 310 to describe changes to both user data and metadata maintained and accessed only by database engine 322 to process access requests. Therefore, LSNs may be assigned to each modification to a data schema, as the modification may be stored by sending a redo log record describing the modification to be stored as part of database metadata, the schema history, as discussed below with regard to FIG. 6B. Moreover, as LSNs are assigned to each change made to user data by sending a redo log record with an assigned LSN to be stored and eventually applied to a corresponding data page in storage service 310, the assigned LSN for a current version of a data page that is accessed to process the access request may also be determined. On-demand schema application 332 may compare the LSN values between an accessed data page for processing an access request (or for multiple accessed data pages) and LSN values for modifications in schema history (either in in-memory schema history cache 347 or the persistent version of schema history in storage service 310). If the accessed data page(s) have LSN values less than a modification for the schema history, then the data pages have not yet been reformatted to match a newer version of the data schema that has been created as a result of a data schema modification request. Therefore, on-demand schema application 332 may apply the translation(s) between the schema version of the stored data and the new version from schema translation 349 to include those modifications with LSN values greater than the LSN value of the data page(s) to the accessed data page(s) (e.g., by reading the pages according to the old format (e.g., old column order), and rewriting the data page(s) to include the formats as part of the write request or reformatting the data page(s) (e.g., according to the translation layer for the new column order) when evaluating and/or returning results to a read request (e.g., a query)) (e.g., as discussed below with regard to FIGS. 6, 8, and 9).

On-demand schema application 332 may manage the contents of schema history 347 and schema translation 349, in at least some embodiments, may execute a background process to apply modifications in the schema history to data page(s) that have not been accessed by a write request. For example, on-demand schema application 332 may implement a garbage collection point for the schema history, which may indicate which modifications to the schema have been applied to a table. In order to advance the garbage collection point, on-demand schema application 332 may determine based on access patterns (or other statistics collected on how frequently data pages are accessed) that remaining data pages that have not been updated include a number modifications after the garbage collection point are not likely to be accessed (e.g., within a period of time), in some embodiments. On-demand schema application 332 may then reformat these data pages according to orderings of columns identified in schema translation 349 to include the modifications so that the garbage collection point can be advanced to include the additionally applied modifications, in some embodiments. In some embodiments, the garbage collection point for schema history may be determined by whether a transaction that was initiated prior to a schema modification (but not yet committed) is ongoing, in some embodiments. The garbage collection point may be maintained so that the prior schema information consistent with the ongoing transaction can be applied to execute the transaction, in some embodiments. Once the transaction is committed, then the garbage collection point may be advanced, in some embodiments.

Database engine head node 320a may also include a data page cache 335, in which data pages that were recently accessed may be temporarily held, in some embodiments. As illustrated in FIG. 3, database engine head node 320a may also include a transaction and consistency management component 330, which may be responsible for providing transactionality and consistency in the database instance of which database engine head node 320a is a component, in some embodiments. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit, in some embodiments.

Database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query parsing, optimization, and execution component 305 (which may, in turn, return them to database client 350a). Client-side storage service driver 325 may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In at least some embodiments, data dictionary information may include a schema history table (or tables) that tracks changes to the data schemas of one or more tables. Schema history table and schema translation mappings may include entries or rows that include data such as the LSN assigned to a modification, the identifier of the table to which the modification applies, a description of the change to be performed (e.g., add, remove, re-order columns, change column data type, etc.), and other information that may be used, such as a transaction identifier for a transaction that included the data schema change. As with other user pages, redo log records may be received from the database engine head node describing changes to data page(s) that store the schema history table 347 and/or schema translation 349. Similarly, entries may be read from the schema history table or schema translation 349 by returning the appropriate user pages of the schema history table 347 or schema translation 349 to the database engine head node upon request (e.g., in case of an in-memory schema history cache miss), in some embodiments.

Figure 4:
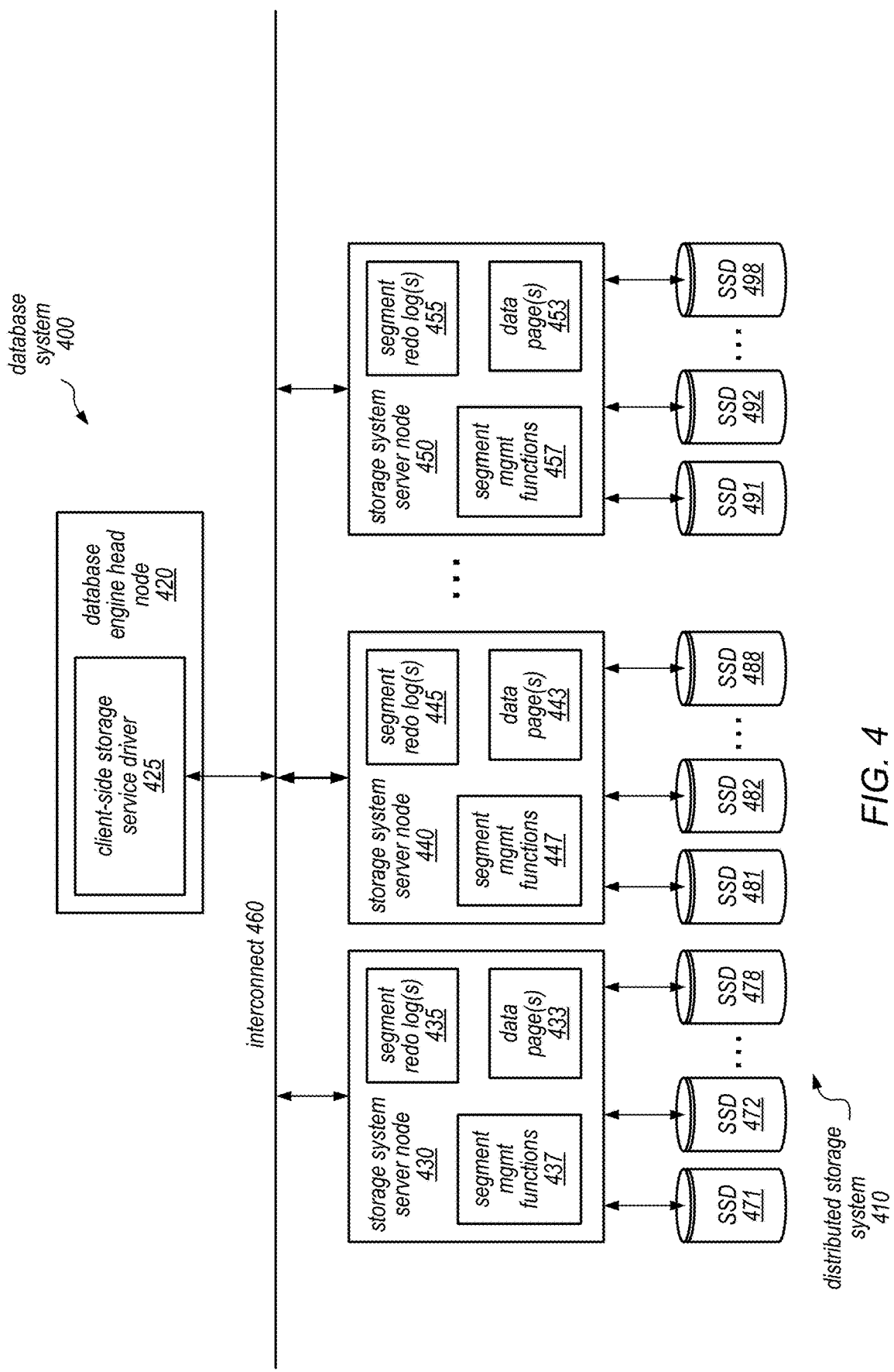
FIG. 4 is a block diagram illustrating a distributed storage system, according to some embodiments.

One embodiment of a distributed storage system is illustrated by the block diagram in FIG. 4. In at least some embodiments, storage nodes 430-450 may store data for different clients as part of a multi-tenant storage service. In some embodiments, a database system 400 may be a client of distributed storage system 410, which communicates with a database engine head node 420 over interconnect 460. As in the example illustrated in FIG. 3, database engine head node 420 may include a client-side storage service driver 425. In this example, distributed storage system 410 includes multiple storage system server nodes (including those shown as 430, 440, and 450), each of which includes storage for data pages and redo logs for the segment(s) it stores, and hardware and/or software may perform various segment management functions. For example, each storage system server node may include hardware and/or software may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery (e.g., determining candidate log records for volume recovery), and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

In some embodiments, each of the storage system server nodes in the distributed storage system may implement a set of processes running on the node server's operating system that manage communication with the database engine head node, e.g., to receive redo logs, send back data pages, etc. In some embodiments, all data blocks written to the distributed storage system may be backed up to long-term and/or archival storage (e.g., in a remote key-value durable backup storage system).

Figure 5:
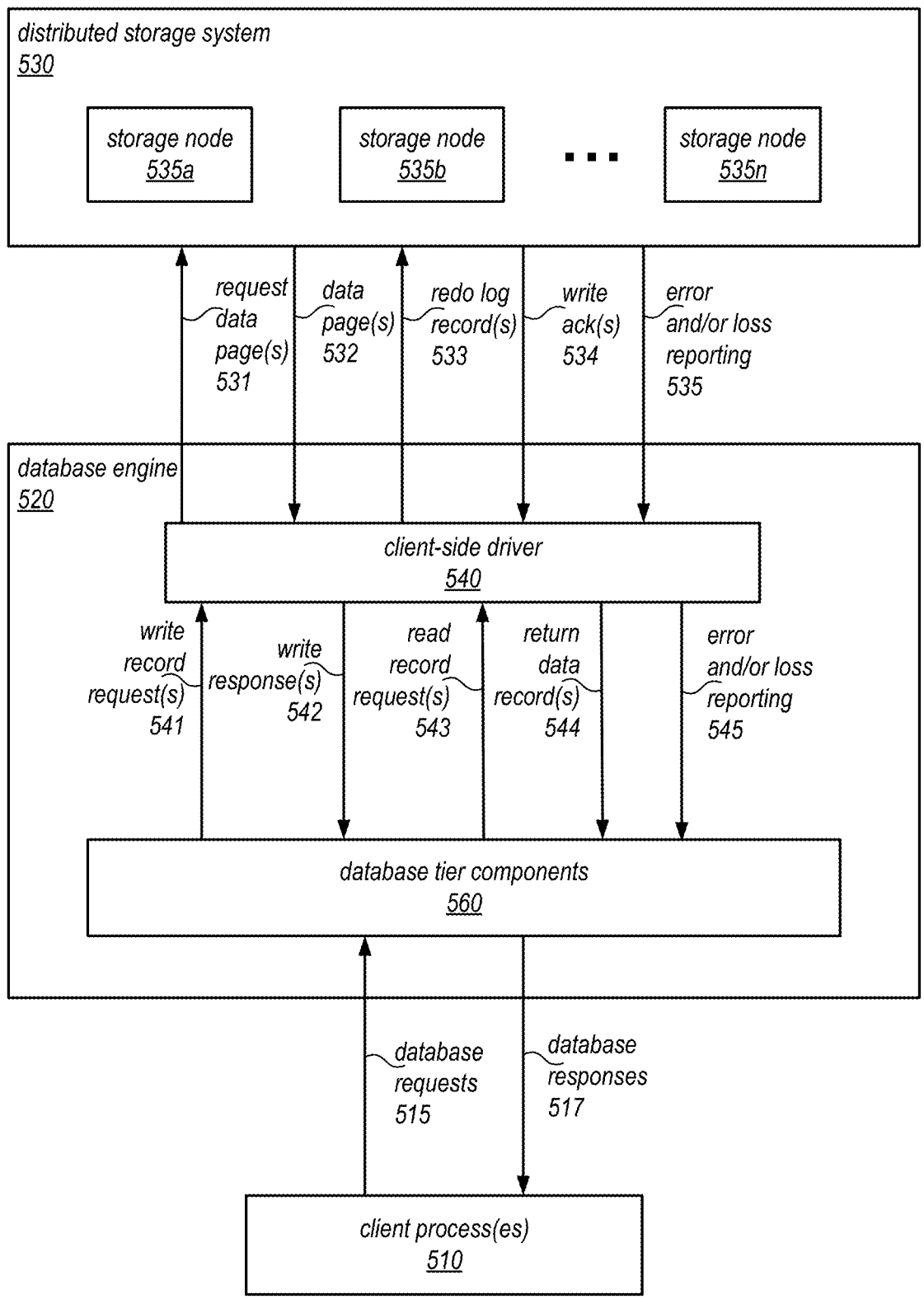
FIG. 5 is a block diagram illustrating the use of a separate distributed storage system in a database system, according to some embodiments.

FIG. 5 is a block diagram illustrating the use of a separate distributed storage system in a database system, according to one embodiment. In this example, one or more client processes 510 may store data to one or more databases maintained by a database system that includes a database engine 520 and a distributed storage system 530. In the example illustrated in FIG. 5, database engine 520 includes database tier components 560 and client-side driver 540 (which serves as the interface between distributed storage system 530 and database tier components 560). In some embodiments, database tier components 560 may perform functions such as those performed by query parsing, optimization and execution component 305 and transaction and consistency management component 330 of FIG. 3, and/or may store log records for data pages, schema history, schema translation mappings, transaction logs and/or undo logs (such as those stored by data page cache 335, transaction log 340, undo log 345, or schema history 347 of FIG. 3). In various embodiments, database engine 520 may have obtained a volume epoch indicator or other identifier from distributed storage system 530 granting access writes to a particular data volume, such as by sending a request to open the data volume to distributed storage system 530.

In this example, one or more client processes 510 may send database requests 515 (which may include read and/or write requests targeting data stored on one or more of the storage nodes 535a-535n) to database tier components 560, and may receive database responses 517 from database tier components 560 (e.g., responses that include write acknowledgements and/or requested data). Each database request 515 that includes a request to write to a data page may be parsed and optimized for execution. Database tier components 560 may either access an cached version of data page(s) in data page cache 335 or may submit read record request(s) 543 to client-side driver (which may request 531 and receive 532 the appropriate data page(s) upon which the write requests are to be performed). Database tier components 560 may then generate one or more write record requests 541, which may be sent to client-side driver 540 for subsequent routing to distributed storage system 530. On-demand schema modifications may be applied when it is determined that the data page(s) storing the data (or the data page that will eventually store the data, in scenarios where new data is inserted) has an assigned LSN (the LSN of the last redo log record applied to the data page, maintained in metadata describing the data page) that is less than one or more LSN values assigned to data schema modifications in data schema history. Thus the write request(s) 541 and subsequently generated redo log record(s) 531 may re-write the contents of the data page(s) (including rows not modified by the write request) according to a new version of the data schema that includes the data schema modifications identified in the data schema history according to a format identified in schema translation mappings (e.g., as discussed below with regard to FIGS. 6-9).

Client side driver may generate one or more redo log records 531 corresponding to each write record request 541, and may send them to specific ones of the storage nodes 535 of specific protection groups storing the partition user data of user data space to which the write record request pertains in distributed storage system 530. Client-side driver 540 may generate metadata for each of the redo log records that includes an indication of a previous log sequence number of a log record maintained at the specific protection group. Distributed storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database request 515 that includes a request to read a data page may be parsed and optimized to generate one or more read record requests 543, which may be sent to client-side driver 540 for subsequent routing to distributed storage system 530. In this example, client-side driver 540 may send these requests 531 to specific ones of the storage nodes 535 of distributed storage system 530, and distributed storage system 530 may return the requested data pages 532 to database engine 520 (specifically to client-side driver 540). Client-side driver 540 may send the returned data pages to the database tier components 560 as return data records 544. As with write requests, on-demand data schema modifications may be performed to reformat received data records into a format that matches a new version of the data schema according to translation(s) using schema translation mappings (e.g., as discussed below with regard to FIGS. 6-9). Database tier components 560 may then evaluate and return the reformatted data (if it satisfies the query predicates or conditions for returning data) and send the reformatted data to one or more client processes 510 as database responses 517.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, the APIs 531-534 of distributed storage system 530 and the APIs 541-545 of client-side driver 540 may expose the functionality of the distributed storage system 530 to database engine 520 as if database engine 520 were a client of distributed storage system 530. For example, database engine 520 (through client-side driver 540) may write redo log records or request data pages through these APIs to perform (or facilitate the performance of) various operations of the database system implemented by the combination of database engine 520 and distributed storage system 530 (e.g., storage, access, change logging, recovery, and/or space management operations). As illustrated in FIG. 5, distributed storage system 530 may store data blocks on storage nodes 535a-535n, each of which may have multiple attached SSDs. In some embodiments, distributed storage system 530 may provide high durability for stored data block through the application of various types of redundancy schemes.

Figure 6:
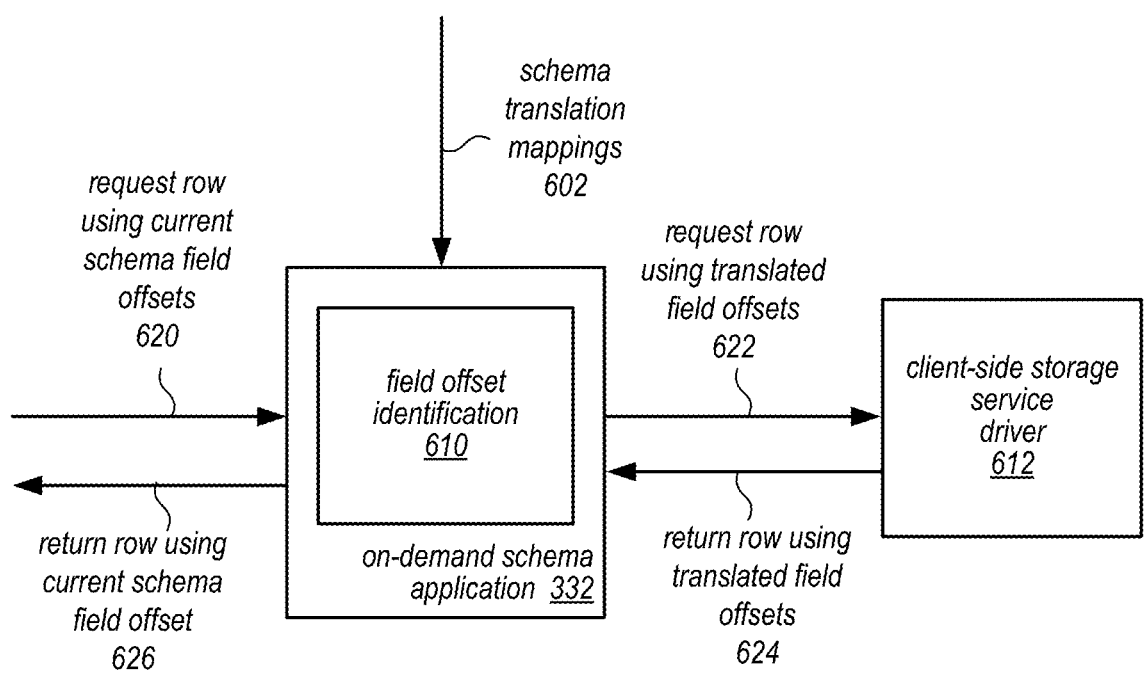
FIG. 6 illustrates field offset identification for online reordering of database table columns, according to some embodiments.

FIG. 6 illustrates field offset identification for online reordering of database table columns, according to some embodiments. As indicated at 620 requests for rows (or records) of a database table may be received, in some embodiments. For example, when a query or other access request is received, a plan (e.g., generated by query parsing, optimization and execution 305) may be generated to identify how to perform the query or other access request. When the plan is executed, requests for individual rows may be performed (e.g., by using an index or by scanning each row individually). Thus a request for a row 620 may be performed as part of executing the plan in order to perform the query or other access request. Multiple other requests for rows (not illustrated) may also be performed in order to query out. The corresponding data page or storage location for a portion of the database table may be identified (e.g., either in the page buffer or remote storage), in some embodiments. The data page may be obtained In some embodiments, the request 620 may identify field offsets for the read using a current schema offsets indicated in the schema history. In other embodiments, no field offsets may be identified. Field offset calculation 610 may be implemented as part of on-demand schema application 332 to read schema translation mappings 602 (e.g., similar to mapping 700 in FIG. 7 below) in order to determine the offset identifiers for each field in storage. For example, request row 620 may request the values of columns using field offsets (e.g., column 1, column 3, column 5). The schema translation mappings 602 may be read, evaluated, or otherwise examined to identify the one or more mappings between the order of the columns expected by the request in 620 and the actual order of the columns in storage. In the present example, for instance, the schema translation mappings may indicate that for the format of the row in storage, column 3 is stored as column 2, and column 5 is stored as column 3. Then on-demand schema application may provide a request for the row using the translated field offsets 622 to client-side storage service driver 612, which may return the row using the translated field offsets 624 and provide them to on-demand schema application 332. On-demand schema application 332 may then translate the results back using field offset calculation 610 and schema translation mappings 602 into the expected column ordering of schema version field offset 626, in some embodiments.

This technique may be applied whether reading or writing to a database table, as writes may first read the row according to the translated format before writing back the row in the new schema format for the current schema, as may be identified by schema translation mappings 602, in some embodiments, as discussed below with regard to FIG. 9.

FIG. 7 illustrates an example schema translation mapping for different storage formats, according to some embodiments. Schema translation mapping 700 may identify the different versions of the column order for an example table "t1", which may be altered using different schema changes. For example, the table may be initially created using an "id" field and "lname" field, as indicated by example SQL statement 712 and illustrated in the column ordering for version 3. Version V3 indicates that "id" is in position 0 and "lname" in position 1. A user may submit another schema change, as indicated by example SQL statement 714. Another column is added "fname" in the position after "id." resulting in a re-ordering of the columns. As indicated in version 2, the offsets change so that "fname" is field "1" and "lname" is field "2." Another schema change may be submitted, as indicated by example SQL statement 716. The table schema modification may add another column "uuid" in first field "0" resulting in another reordering, where "id" moves to field "1", "fname" to field "2", and "lname" to field "3" as illustrated in column order V1. A final schema version change indicated by SQL statement 718 adds "phone" and "zip" columns to the table schema, resulting in a different ordering again. As illustrated, column order V0 positions "uuid" first, at place "0", "id" second, at place "1", "fname" third, at place "2", "phone" fourth, at place "3", "lname" fifth, at place "4", and "zip" sixth, at place "5".

Because the offset values of the database table schema columns are recorded in schema translation mapping 700, the format of any one row in storage can be translated to another version, in some embodiments. For example, if the LSN for a data page being accessed to read a row or record has an LSN value that is less than the LSN value associated with the schema change to create column order V2 and greater than the LSN value associated with the schema change to create column order V3, then the records (including the desired record) in the data page may be stored according to the column order V3 (e.g., where only "id" and "lname" values are stored, in some embodiments. The access request may be performed by reading the row in the data page according to column order V3, and then reordering the columns to perform the access request using another column order (e.g., reordering to column order V0). Moreover, as updates to rows (or data pages, blocks, or other portions of a database table) may be performed independently (e.g. when the rows are accessed by a user to perform a write), in some embodiments, then different rows (or data pages, blocks or other portions of the database table) may be stored according to different column order versions (e.g., the rows of one data page may be stored according to column order V2 and the rows of another data page may be stored according to column order V1).

In some embodiments, system fields or columns may be automatically translated (but are not illustrated in FIG. 7). For example, system columns may occupy positions after user visible data, such as "uuid" and thus may be reordered along with the user visible columns.

Figure 8:
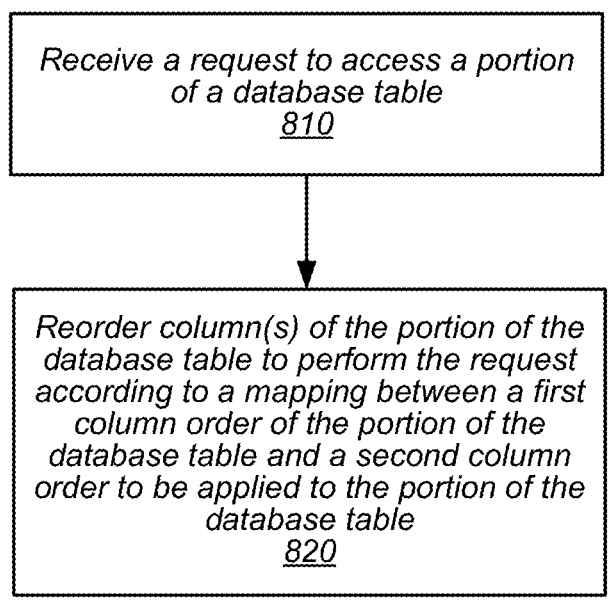
FIG. 8 is a high-level flowchart illustrating techniques to implement online reordering of database table columns, according to some embodiments.

The database service and storage service discussed in FIGS. 2 through 7 provide examples of a system that may perform storage format translation for online reordering of database table columns. However, various other types of data stores (e.g., database systems that do not utilize a separate storage system) or other storage engines may implement on-demand data schema modifications for online reordering of database table columns. FIG. 8 is a high-level flowchart illustrating techniques to implement online reordering of database table columns, according to some embodiments. Various different systems and devices may implement the various methods and techniques described below, either singly or working together. For example, a database engine head node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 810, a request may be received to access a portion of a database, in various embodiments. For example, the access request may be formatted according to a protocol or language for accessing a database (e.g., SQL) or an application programming interface (e.g., API), in some embodiments. The request to access the portion of the database table may specifically identify the portion of the database table, in some embodiments (e.g., a request to access a record (or records) with a specific value, such as a request to write to a record with a particular "user id."). In some embodiments, the request to access the portion of the database table may be part of accessing multiple portions (or all) of a database table (e.g., a query that initiates a scan of a database table). The request may also be part of accessing multiple database tables (e.g., a query that joins data from two different tables), in some embodiments. As discussed below with regard to FIG. 9, the access request may be a request to read or write to the portion of the database table, in some embodiments. A portion of the database table may be a row, record, page, block, or other part of the database table which may, in some embodiments, store other data not targeted by the access request (e.g., a data page may store rows not targeted by the access request in addition to a row that is targeted by the access request).

As indicated at 820, responsive to the request, one or more columns of the portion of the database table may be reordered to perform the request according to a mapping between a first column order of the portion of the database table and a second column order to be applied to the portion of the database table, in some embodiments. For example, the first column order may be identified as the column order of the portion of the database table as it is stored in storage (e.g., on disk-based storage devices, on persistent memory, on flash-based storage devices, or in other persistent storage devices). The mapping, such as the mapping illustrated above with regard to FIG. 7, may indicate how to interpret the portion of the database table according to the first column order and indicate the changes between the first column order and the second column order (which may be the expected column order of the database table according to the current schema of the database table or the schema of the database table associate with the access request which could be an older version of the schema if the schema were altered after the access request was received), in some embodiments. Reordering of the column(s) may be performed temporarily in order to provide data in response to the request, in some embodiments. In some embodiments, reordering of the column(s) may be performed in storage so that the reordered column(s) are persisted for future access requests.

Please note that processing of different portions of the database for a same access request may result in some portions being reordered due to a difference in column orders, while other portions of the database accessed may not be reordered (e.g., for the same query or update request), in some embodiments.

Figure 9:
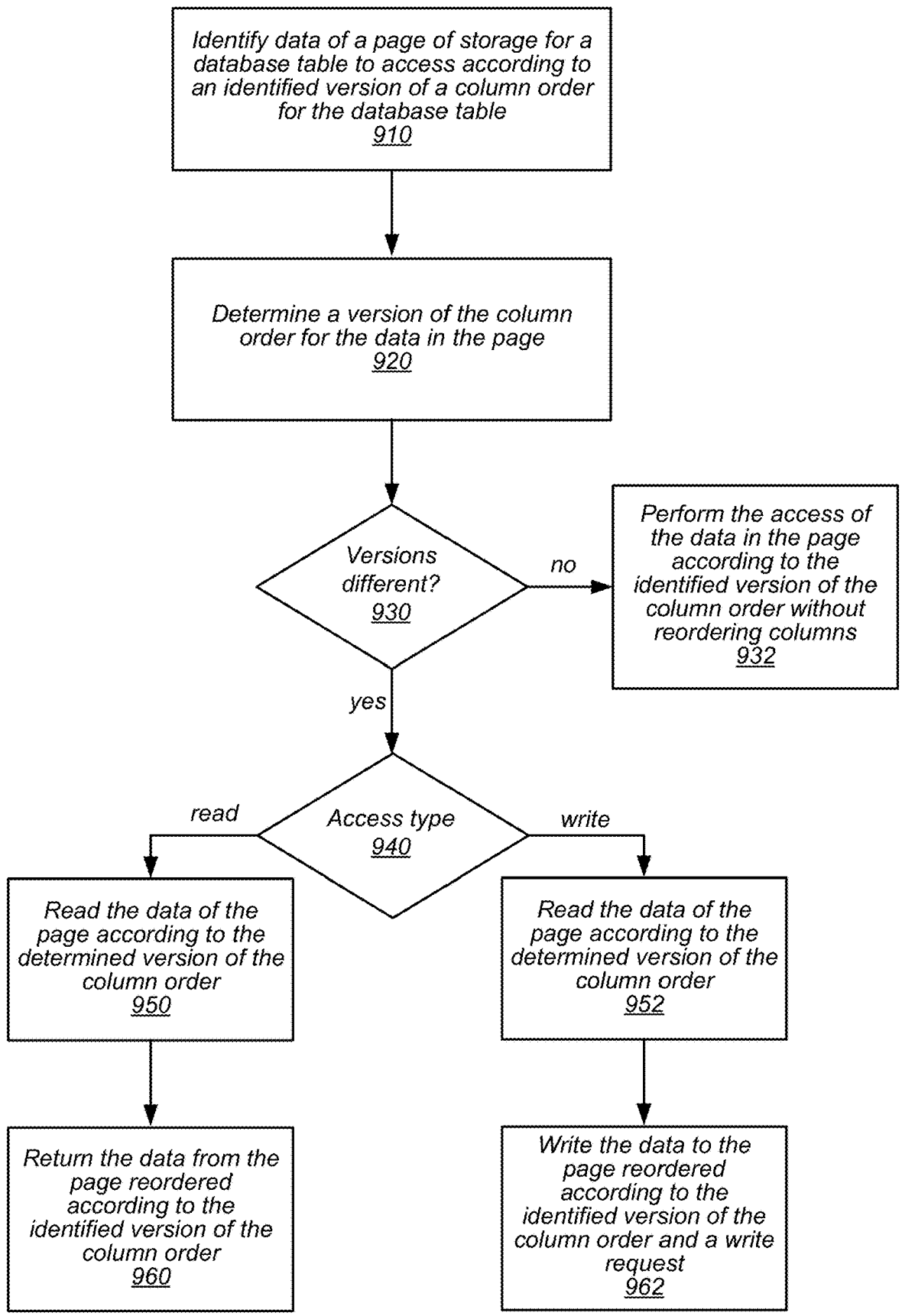
FIG. 9 is a high-level flowchart illustrating techniques to implement online reordering of database table columns for different types of access requests, according to some embodiments.

FIG. 9 is a high-level flowchart illustrating techniques to implement online reordering of database table columns for different types of access requests, according to some embodiments. As indicated at 910, a data page of storage for a database table may be identified to access according to an identified version of a column order for the database table, in some embodiments. For example, as discussed above, a plan may be generated to perform an access request and may include instructions to read pages of storage for the database table in order to locate desired data (e.g., that satisfies one or more predicates), in some embodiments. The identified version of the column order for the database table may be a latest version of column order according to a latest database table schema or older version of column order that may be determined according to the state or view of the database table that is accessible when a request that causes the access is received (e.g., a consistent view of the database table as of an identified point in logical time associated with a query that is received), in some embodiments.

As indicated at 920, a version of the column order for the data in the page may be determined, in some embodiments. For example, each page may include metadata which indicates a point in logical time at which any of the data within the page was last updated (e.g., a log sequence number (LSN)), in some embodiments. Based on the point in logical time, a version of the column order may be determined, in some embodiments. For example, each of the different versions of column order illustrated in FIG. 7 may be associated with a different LSN value. The determined version may be the latest version of the column order with an LSN value less than the LSN value of the page, in some embodiments (e.g., where page LSN>=V1 LSN and page LSN<V2 LSN, the determined version may be V1). In some embodiments, schema versions or column order version numbers may be recorded in metadata for a page or included in a system column of a record that may not be visible to a user may be stored, which may indicate a column order for the data in the page.

As indicated at 930, a determination may be made as to whether the identified version for accessing the page and the determined version of the page are different, in some embodiments. If not, as indicated at 932, the access of the data in the page may be performed according to the identified version of the data page without reordering columns, in some embodiments. If the versions are different, as indicated by the positive exit from 930, then different operations may be performed based on the access type, as indicated at 940, in some embodiments. For example, if the access type is to read the data on the page (but not write to it), then as indicated at 950, the data of the page (e.g., individual field values of a row, the entire row, or multiple rows in the page) may be read according to the determined version of the column order (e.g., by utilizing positions, locations, or field offsets based on the determined version of the column order as discussed above with regard to FIG. 6), in some embodiments. Then, as indicated at 960, the data from the page may be returned reordered according to the identified version of the column order (e.g., by returning data with columns in a sorted order, returning data with an additional column that has a default value, returning data with a column removed, etc.), in various embodiments.

If the access type is to write the data on the page, then as indicated at 952, the data of the page (e.g., individual field values of a row, the entire row, or multiple rows in the page) may be read according to the determined version of the column order (e.g., by utilizing positions, locations, or field offsets based on the determined version of the column order as discussed above with regard to FIG. 6), in some embodiments. Then as indicated at 962, the data may be written to the page reordered according to the identified version of the column order and a write request, in some embodiments (e.g., by writing the data with columns in a sorted order, writing the data with an additional column that has a default value, writing the data with a column removed). For example, writing may include writing values specified in a client request to write to the database table (e.g., setting a value of a column as specified in an UPDATE statement) when writing the reordered columns, in some embodiments. In some embodiments, other data in the page may be reordered and rewritten back to the page (e.g., reordering row(s) in the page that were not requested or otherwise identified to be access in response to a client request).

Figure 10:
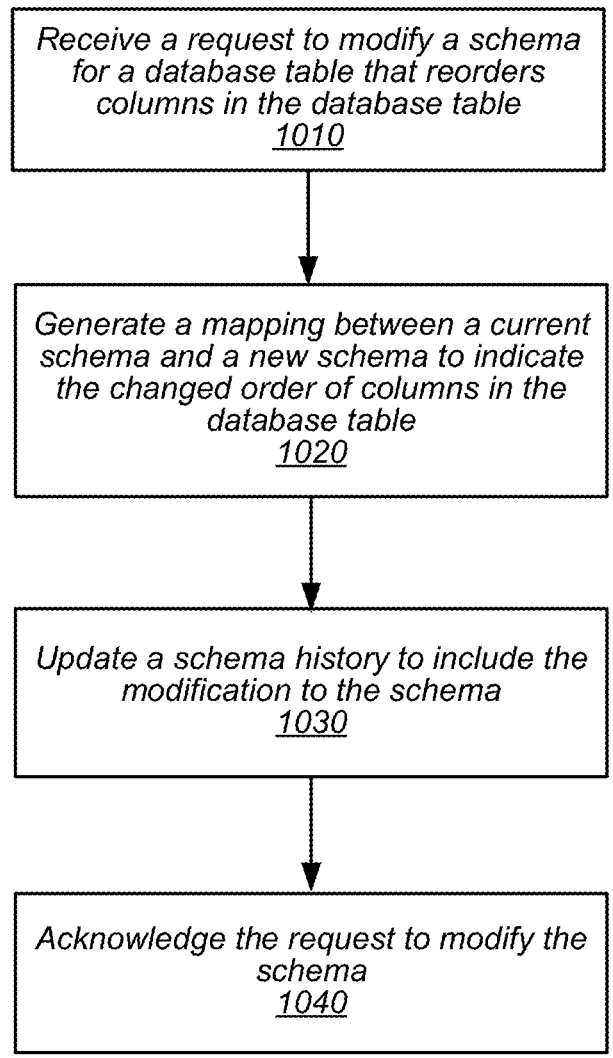
FIG. 10 is a high-level flowchart illustrating techniques to implement storage format translations for online reordering of database table columns, according to some embodiments.

FIG. 10 is a high-level flowchart illustrating techniques to implement storage format translations for online reordering of database table columns, according to some embodiments. As indicated at 1010, a request may be received to modify a schema for a database table that reorders columns in the database table, in various embodiments. The modification request may include various kinds of data schema modifications. For example, in a data store implementing a SQL interface, an ALTER TABLE statement may be submitted to add a column, drop a column, reorder columns, make a column NULL, make a column NOT NULL, sort or otherwise re-order columns. In some embodiments, data schema modifications may include modifying a data type of a column or assigning a default value to a column (e.g., as a constant value or a value derived from a provided expression, such as column C default value=average (column A, column B)), which may be saved in schema history and applied upon later access. In at least some embodiments, the modification request may include a flag, value or indicator that on-demand modification of the table according to the request may be performed so that the modification request is handled as an online request. Other modification requests may indicate offline processing or other online processing that is not on demand. In at least some embodiments, on-demand data schema modification may be a default setting for a data storage engine, and a separate request to disable or re-enable the setting may be performed.

As indicated at 1020, a mapping between a current schema and a new schema to indicate the changed order of columns in the database table may be generated, in some embodiments. For example, a new column may be added to a translation table, as illustrated in FIG. 7, or an update may be made to an array, index or other data structure that identifies field offsets or other ordering indications for the columns, in some embodiments.

As discussed above, in at least some embodiments, a schema history for the database table may be updated to include the modification, as indicated at 1030. For example, in some embodiments a write operation to the memory device maintaining a cached version of schema history may be performed to add a new entry to a schema history table, including information such as an identifier for the data set modified, a version indicator (e.g., an LSN) assigned to the modification, and the change to be applied, for example. In some embodiments, whether or not caching is implemented, a persistent schema history maintained for the database table may be updated to include the modification. As with updating the cache, in some embodiments, a write operation may be performed to persistent storage maintaining a schema history table, including similar information, such as the identifier for the data set modified, the version indicator (e.g., an LSN) assigned to the schema modification and the change to be applied. Once the modification is included in the schema history and the translation generated, the schema change may be considered committed and the request to modify the schema may be acknowledged as complete, as indicated at 1040, in various embodiments.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 11:
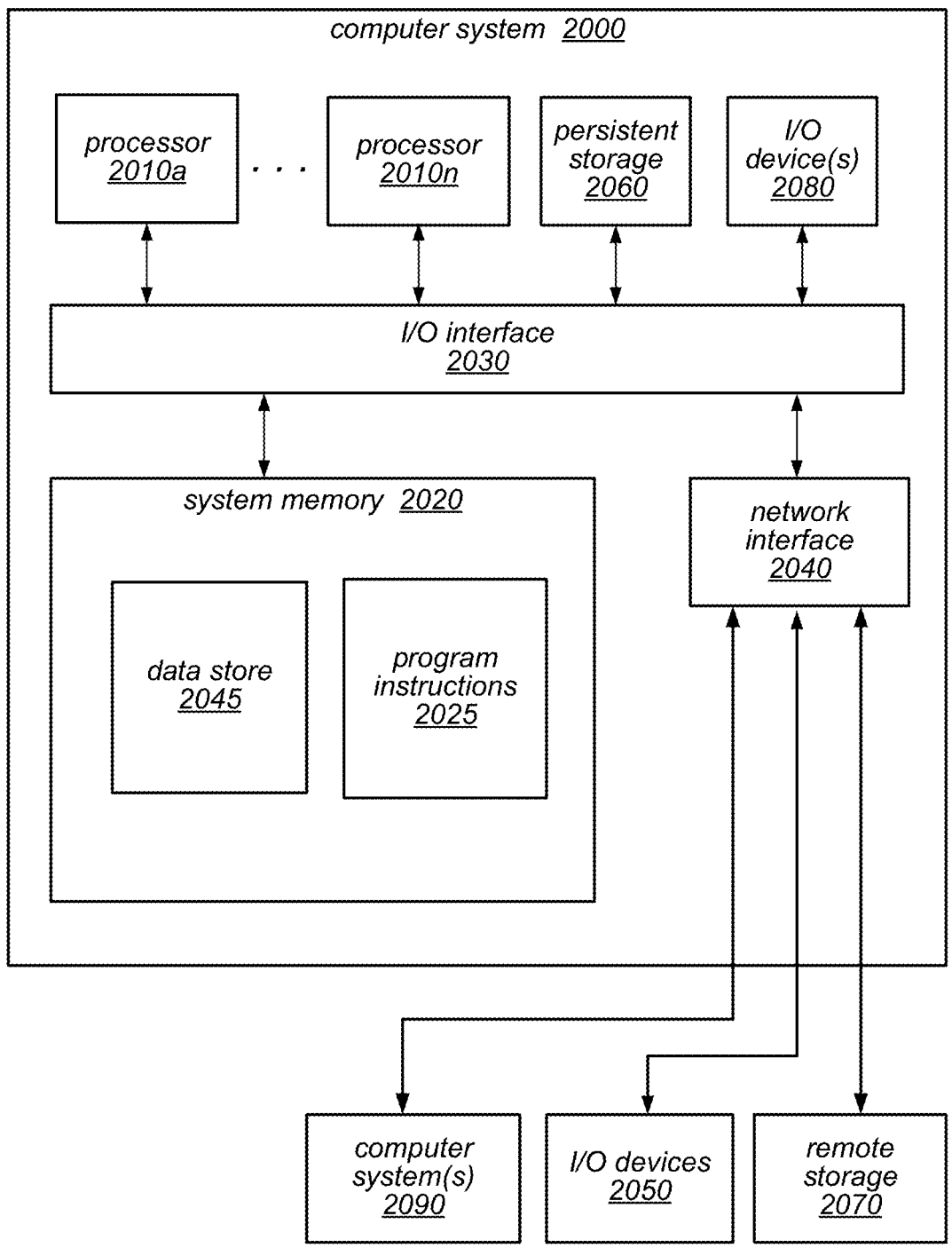
FIG. 11 is an example computer system, according to various embodiments.

FIG. 11 is a block diagram illustrating a computer system that may implement online reordering of database table columns, as well as various other systems, components, services or devices described above. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device, computing node, or electronic device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that may store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to perform a method to at least:
  responsive to a request to reorder one or more columns of a database table store a mapping between a current column order for the database table and a new column order for the database table; and
  responsive to a request to access a portion of the database table in the new column order:
   reorder the one or more columns of the portion of the database table stored in the database table in the current column order according to the mapping between the current column order and the new column order; and
   access the reordered portion of the database table in the new column order.

2. The system of claim 1, wherein the request to access the portion of the database table is a request to read data from the portion of the database table and wherein to reorder the one or more columns of the portion of the database table to perform the request to access the database table, the program instructions further cause the at least one processor to perform the method to:
 read the data from the portion of the database table in storage according to the current column order; and
 return the data from the portion reordered according to the new column order.

3. The system of claim 1, wherein the request to access the portion of the database table is a request to write to data in the portion of the database table and wherein to reorder the one or more columns of the portion of the database table to perform the request to access the database table, the program instructions further cause the at least one processor to perform the method to:
 read the data from the portion of the database table in storage according to the current column order; and
 write the data to the portion reordered according to the new column order.

4. The system of claim 1, wherein the at least one processor is implemented as part of a network-based database service that hosts the database table, wherein data of the database table is stored in a separate storage service accessible to the database service, wherein the database service comprises a network interface allowing a client to access the database table, and wherein the request to reorder the one or more columns of the database table and the request to access the portion of the database table are received via the network interface for the network-based database service.

5. A method, comprising:
 responsive to a request to access a portion of a database table in a second column order, reordering one or more columns of the portion of the database table stored in the database table in a first column order according to a mapping between the first column order of the portion of the database table and the second column order; and
 accessing the reordered portion of the database table in the second column order.

6. The method of claim 5, further comprising:
 responsive to a request to reorder the one or more columns of the database table from the first column order to the second column order, storing the mapping between the first column order for the database table and the second column order for the database table.

7. The method of claim 6, further comprising:
 responsive to the request to reorder the one or more columns of the database table, updating a schema history for the database table to identify a change to a schema for the database table that reorders the one or more columns.

8. The method of claim 6, wherein the request to reorder the one or more columns of the database table is:
 a request to add at least one column to the database table;
 a request to remove at least one column from the database table; or
 a request to sort columns in the database table.

9. The method of claim 5, wherein the request to access the portion of the database table is a request to read data from the portion of the database table and wherein reordering the one or more columns of the portion of the database table to perform the request to access the database table comprises:
 reading the data from the portion of the database table in storage according to the first column order; and
 returning the data from the portion reordered according to the second column order.

10. The method of claim 5, wherein the request to access the portion of the database table is a request to write to data in the portion of the database table and wherein reordering the one or more columns of the portion of the database table to perform the request to access the database table comprises:
 reading the data from the portion of the database table in storage according to the first column order; and
 writing the data to the portion reordered according to the second column order.

11. The method of claim 10, wherein the portion is a page of storage for the database table, wherein the data is a row stored in the page, and wherein reordering the one or more columns of the portion of the database table to perform the request to access the database table further comprises:
 rewriting one or more other rows stored in the page according to the second column order.

12. The method of claim 5, further comprising:
 responsive to a second request to access a second portion of the database table, performing the second request without reordering columns in the second portion of the database table.

13. The method of claim 5, further comprising:
responsive to a second request to access a second portion of the database table, reordering one or more columns of the second portion of the database table to perform the second request according to a mapping between the first column order and a third column order to be applied to the second portion of the database table.

14. A non-transitory, computer-readable storage medium, storing program instructions that when executed by one or more computing devices cause the one or more computing devices to implement:
receiving a request to access a portion of a database table in a second column order;
reordering one or more columns of the portion of the database table stored in the database table in a first column order according to a mapping between the first column order of the portion of the database table and the second column order; and
accessing the reordered portion of the database table in the second column order.

15. The non-transitory, computer-readable storage medium of claim 14, wherein the request to access the portion of the database table is a request to read data from the portion of the database table and wherein, in reordering the one or more columns of the portion of the database table to perform the request to access the database table, the program instructions cause the one or more computing devices to further implement:
reading the data from the portion of the database table in storage according to the first column order; and
returning the data from the portion reordered according to the second column order.

16. The non-transitory, computer-readable storage medium of claim 14, wherein the request to access the portion of the database table is a request to write data to the portion of the database table and wherein, in reordering the one or more columns of the portion of the database table to perform the request to access the database table, the program instructions cause the one or more computing devices to implement:
reading the data from the portion of the database table in storage according to the first column order; and
writing the data to the portion reordered according to the second column order.

17. The non-transitory, computer-readable storage medium of claim 14, further wherein the program instructions cause the one or more computing devices to further implement:
responsive to a request to reorder the one or more columns of the database table, storing the mapping between the first column order for the database table and the second column order for the database table.

18. The non-transitory, computer-readable storage medium of claim 17, wherein the request to reorder the one or more columns of the database table is a request to add at least one column with a specified default value.

19. The non-transitory, computer-readable storage medium of claim 14, wherein, in reordering the one or more columns of the portion of the database table to perform the request to access the database table, the program instructions cause the one or more computing devices to implement identifying respective field offsets for the first column order and the second column order according to the mapping.

20. The non-transitory, computer-readable storage medium of claim 14, wherein the one or more computing devices are implemented as part of a network-based database service that hosts the database table, wherein the database service comprises a network interface allowing a client to access the database table, and wherein the request to access the portion of the database table is received via the network interface for the network-based database service.

* * * * *